Aug. 2, 1960  H. SCHWARTZ ET AL  2,947,529
DISC-TYPE SUSPENSION SPRING
Filed Dec. 3, 1957

INVENTOR.
HERBERT SCHWARTZ
JULIAN B. PINTO
BY

*Christie, Parker & Hale*

ATTORNEYS

United States Patent Office 2,947,529
Patented Aug. 2, 1960

2,947,529

DISC-TYPE SUSPENSION SPRING

Herbert Schwartz and Julian B. Pinto, West Covina, Calif., assignors to Bell & Howell Company, Chicago, Ill., a corporation of Illinois Filed Dec. 3, 1957, Ser. No. 700,495

1 Claim. (Cl. 267—1)

This invention relates to suspension springs for providing rectilinear guidance to a suspended mass, for example, in a vibration pick-up or the like.

In vibration pick-ups and other mechanical devices, springs are employed for suspending masses in so-called frictionless guidance systems.

Springs heretofore proposed for use in such guidance systems are unsatisfactory because of poor rectilinear guidance, too narrow a range of rectilinear movement and non-linear stiffness over wide ranges of deflection. A diaphragm spring, for example, generally is too stiff and non-linear over the deflection range. A spider spring is unsatisfactory because it contributes an undesirable torsional component to the movement of the suspended mass.

I have developed a novel suspension spring which is not subject to any of the foregoing disadvantages. It produces good rectilinear guidance, has a linear stiffness over a wide range of deflection and a lateral stiffness constant that is 50 to 100 times greater than the axial constant of the spring.

The spring of my invention is of the disc-type and comprises a central member, an outwardly extending succession of resilient rings disposed around the central member, an outer member disposed outside the outermost ring and a plurality of sets of spaced connectors respectively joining the central member to the innermost ring, adjacent rings to each other, and the outermost ring to the outer member.

Preferably the rings, the central member and the outer member are all concentric and round, but square, triangular, oval, and other shapes may be employed.

The spring preferably is integral and may be formed conveniently from a single sheet of material. Flat springs are preferred, but if desired, the main plane of the spring may be dished.

The connectors as well as the rings preferably are resilient. In my preferred construction, the connectors of each set are spaced equidistant from each other around the spring; alternate sets of connectors are staggered and every second set of connectors lines up radially.

For best results outer rings are progressively wider in a radial direction. Similarly, the spacings between rings are progressively wider starting from the center. It also may be desirable to make the rings progressively thicker from inside to outside of the spring, the thickness being measured in a direction transverse to the main plane of the spring. All three of these features of the invention tend to produce uniform resiliency over the entire spring.

Another way to obtain uniform resiliency in the spring is to progressively increase the number of connectors in the sets as the outside of the spring is approached. Thus, there will be fewer connectors between inner rings and more connectors between outer rings. This solution to the problem is, however, less desirable, because the inner portions of the spring with fewer connectors tend to cant more than the outer portions.

These and other aspects of my invention will be understood completely in the light of the following detailed description. This is illustrated by the accompanying drawings, in which.

Figure 1:
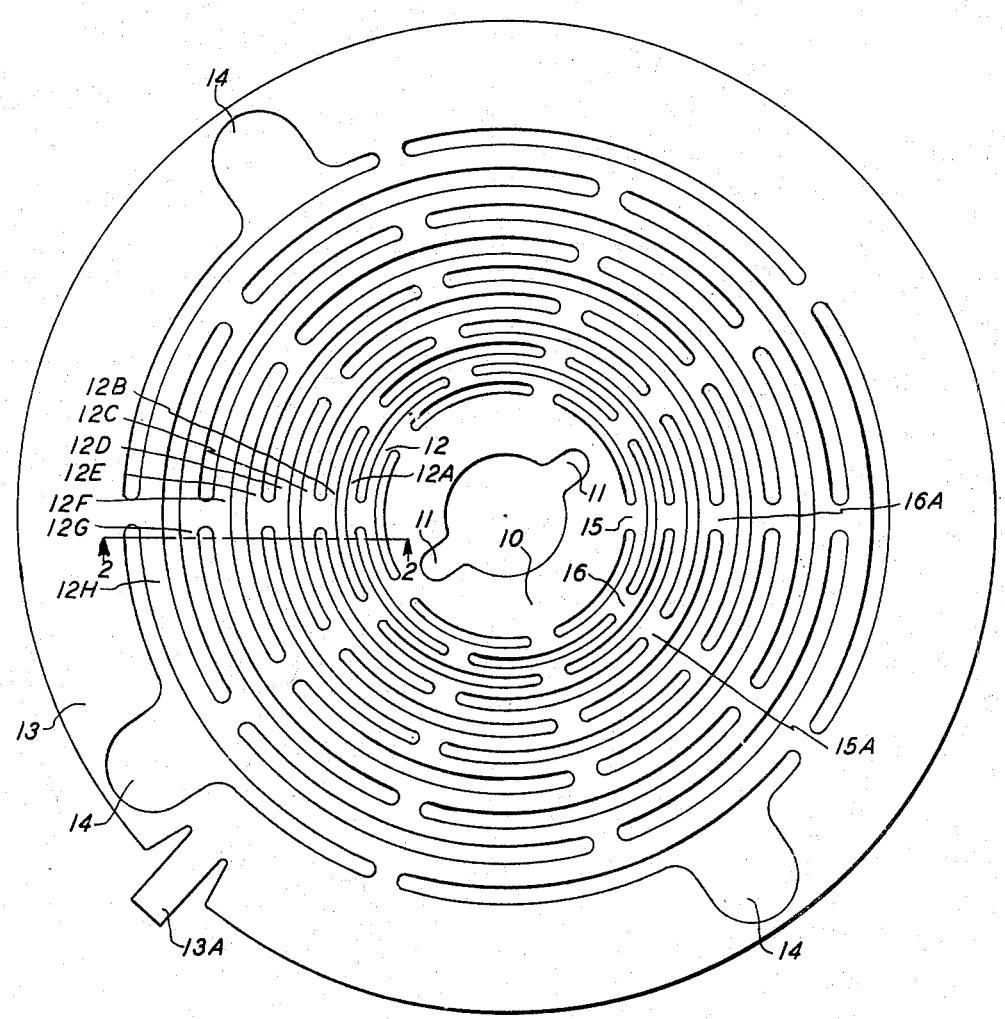
Fig. 1 is an enlarged plan view of a preferred spring of my invention.
Figure 2:
Fig. 2 is a detailed section of a portion of the spring of Fig. 1 taken along the line 2—2.

The spring illustrated in the drawings is integral and formed from a single sheet of material, say thin resilient metal. It includes a central mounting member 10 which may be fastened to a seismic mass (not shown) by screws or the like passed through indentations 11. Around the central member is a series of nine progressively larger resilient round rings 12, 12A, 12B, 12C, 12D, 12E, 12F, 12G, 12H, each disposed in the same plane (the main plane of the spring) and concentric with and spaced from each other and the central member. As shown in Fig. 1, the rings are progressively wider in a radial direction from the inside toward the outside of the spring. As shown in Fig. 2, the rings are progressively thicker in a direction transverse to the main plane of the spring as the periphery of the spring is approached. Similarly, the spaces between springs are progressively wider as the periphery is approached.

Surrounding the central member and the several springs is an outer annular concentric mounting member 13 adapted for connection to a base (not shown) if a seismic mass is fastened to the central member. However, if desired, the central member may be fastened to the base and an annular seismic mass (not shown) may be fastened to the outer member. The outer member is provided with indentations 14 spaced around its periphery for fastening either the seismic mass or the base.

The outer annular member is provided with a radial integral tab 13A so that the spring can be employed as part of an electrical circuit (not shown) to the seismic mass.

The innermost resilient ring is fastened to the central member by a first set of five integral resilient equally spaced radial connectors 15. The innermost ring is also fastened to the ring immediately outside it by a second set of five conectors 16, but this second set is staggered radially and symmetrically from the first set. A third set of connectors 15A radially in line with the first set of connectors 15 is disposed between the second and third rings. A fourth set of connectors 16A connects the third and fourth rings and this set is in line radially with the second set of conectors 16. The foregoing pattern is followed with other sets of connectors until the final set of connectors joins the outermost ring to the outer member.

Although it is conceivable that a set of only two connectors could be used between rings, this is undesirable because it permits too great a degree of flexure in the spring as a whole, increases the tendency to cant, and reduces its ability for rectilinear guidance. Consequently I prefer that each set of connectors be at least three in number. In large springs there should be even more connectors in each set.

An increase in the number of connectors between adjacent members increases the stiffness of the spring by decreasing the length of the cantilever arm between connectors.

The natural resonant frequency of a spring should be outside the range of frequencies of a pickup unit or the like. Therefore, it would be desirable in many instances to adjust the spring so as to place the natural resonant frequency outside the frequency range of the spring. An increase in the number of connectors and rings increases the natural resonant frequency of the spring as a whole. Thus, by controlling the number of connectors and the number of rings the stiffness and natural resonant frequency of the whole is determined. For example, an annular flat spring about an inch in diameter and constructed in accordance with the invention with eight rings, each of which is connected to an adjacent member by a set of three connectors, has a natural resonant frequency of 300 cycles per second. A similar spring having nine rings and five connectors in each set between adjacent members (as shown in the drawings) has a natural resonant frequency of 550 cycles per second.

In both of the foregoing examples, the springs were formed by etching a sheet of "Ni-Span C" which is a spring material alloy consisting of nickel, chromium, titanium and iron produced by H. A. Wilson Company, Union, New Jersey. The etching is followed by heat treatment to temper. The sheet was about .0015" thick. In both cases the resulting springs had a low axial stiffness spring constant and a high radial spring constant with an unusually large linear deflection range along an axis perpendicular to the main plane of the spring.

A variety of spring materials may be used to form the springs of my invention. These include beryllium copper, phosphor bronze, stainless steel or possibly cardboard for inexpensive applications.

The springs of the invention may be made by stamping or cutting, but I prefer to form the springs from sheet material by etching, especially when they are small in size. The etching method of forming the spring is advantageous because during the final etching the inner and narrower rings tend to decrease in thickness more rapidly than the wider rings having larger diameters. Thus, starting with a sheet of material of uniform thickness and an initial etching to dissolve the metal in the spaces between the rings, a rough spring is formed. Following the initial etching, the spring is cleaned by conventional solvents, if necessary, to remove materials remaining on the spring from the initial etching process. The resulting spring which is substantially of uniform thickness is then heat treated while it is being held flat to prevent bending or warping of the rings during heating. The spring may then be finally adjusted by dipping in an etching solution. Dipping or successive dippings in the etching solution dissolves a portion of the rings to decrease the stiffness of the spring. The narrower inner rings are dissolved faster than the wider outer rings. Therefore, the inner rings will be thinner and the outer rings will be thicker in the final spring shown in Fig. 2. This tends to give the spring as a whole a more uniform deflection over a wider range.

Although there is no limit to the size of the springs of my invention nor to the variety of their application, they afford great advantages in very small seismometers, vibration detectors and the like. By way of example, a spring such as that shown in Figs. 1 and 2 having the following dimensions: an overall outer diameter of 1.05 inches, an outer annular member inner diameter of .8 inch, and a central member outer diameter of .26 inch which is formed from a sheet of material .0015 inch thick has a natural resonant frequency of 550 cycles per second. This spring has given excellent service in a vibration meter employing a small seismic mass attached to the center. The vibration meter in which this spring is used is made for metering frequencies from 0 to 500 cycles per second and the natural resonant frequency of 550 cycles per second of the spring is outside the intended frequency range of the vibration meter.

We claim:

A suspension spring integrally formed from a disc of thin, resilient material and having a substantially circular central member; a plurality of radially spaced apart concentric rings disposed around the central member; the width, thickness and spacing between rings being progressively greater as the outer of said rings is approached; and a set of at least three relatively narrow spaced apart connecting members for respectively joining the central member with the adjacent ring and adjacent rings with each other, each set of three connecting members being symmetrically arranged between the central member and the said outer ring, with adjacent sets of connectors being staggered to define at least six series of radially aligned connecting members, each series of radially aligned connecting members comprising a connector from every second set of connectors whereby a bending movement of the portions of each ring intermediate the pairs of adjacent connectors is allowed and provides rectilinear motion of a mass attached to the spring.

References Cited in the file of this patent

UNITED STATES PATENTS

| Number | Name | Date |
|---|---|---|
| 341,601 | Poor | May 11, 1886 |
| 2,171,185 | Maier | Aug. 29, 1939 |

FOREIGN PATENTS

| Number | Country | Date |
|---|---|---|
| 2,222 | Great Britain | of 1872 |
| 70,946 | Switzerland | Nov. 1, 1915 |
| 97,864 | Austria | Sept. 10, 1924 |
| 463,160 | Germany | July 23, 1928 |
| 1,010,503 | France | Mar. 26, 1952 |
| 1,021,778 | France | Dec. 3, 1952 |